United States Patent

[11] 3,573,819

[72] Inventors Jack Scott Mason
Richardson;
Harry Allen Currie, Farmers Branch;
Kenneth D. Maxwell, Dallas; Richard Allen
Perry, Richardson; Mitchell M. Wilkinson,
Dallas, Tex.
[21] Appl. No. 816,509
[22] Filed Apr. 16, 1969
[45] Patented Apr. 6, 1971
[73] Assignee Texas Instruments Incorporated
Dallas, Tex.

[54] RADIO POSITION DETERMINING SYSTEM
4 Claims, 5 Drawing Figs.
[52] U.S. Cl..................................................... 343/6.5,
343/13, 343/15, 343/17.2
[51] Int. Cl...................................................... G01s 9/06,
G01s 9/56
[50] Field of Search...........................................343/6.5, 13,
15, 17.2, 17.2 (PC), 112.3

[56] References Cited
UNITED STATES PATENTS
3,276,015  9/1966  Lerwill et al..................  343/6.5
3,397,400  8/1968  Maass et al. ..................  (343/112.3)
3,400,396  9/1968  Cook et al. ....................  (343/17.2PC)

Primary Examiner—Richard A. Farley
Assistant Examiner—Malcolm F. Hubler
Attorneys—Harold Levine, Andrew M. Hassell, James O.
Dixon, Rene E. Grossman and Melvin Sharp ABSTRACT: A master station onboard a vessel transmits coded pulses to a pair of shore stations. The shore stations respond with transmissions of coded pulses which are received by the master station. The round trip traveltime of the pulses is then measured to compute the distance of the vessel from each of the shore stations for determination of the position of the vessel. Pulse compression techniques are utilized by the system in order to provide accurate resolution at ranges up to several hundred miles from shore and to enable operation of the system at all times without substantial degradation of resolution accuracy.

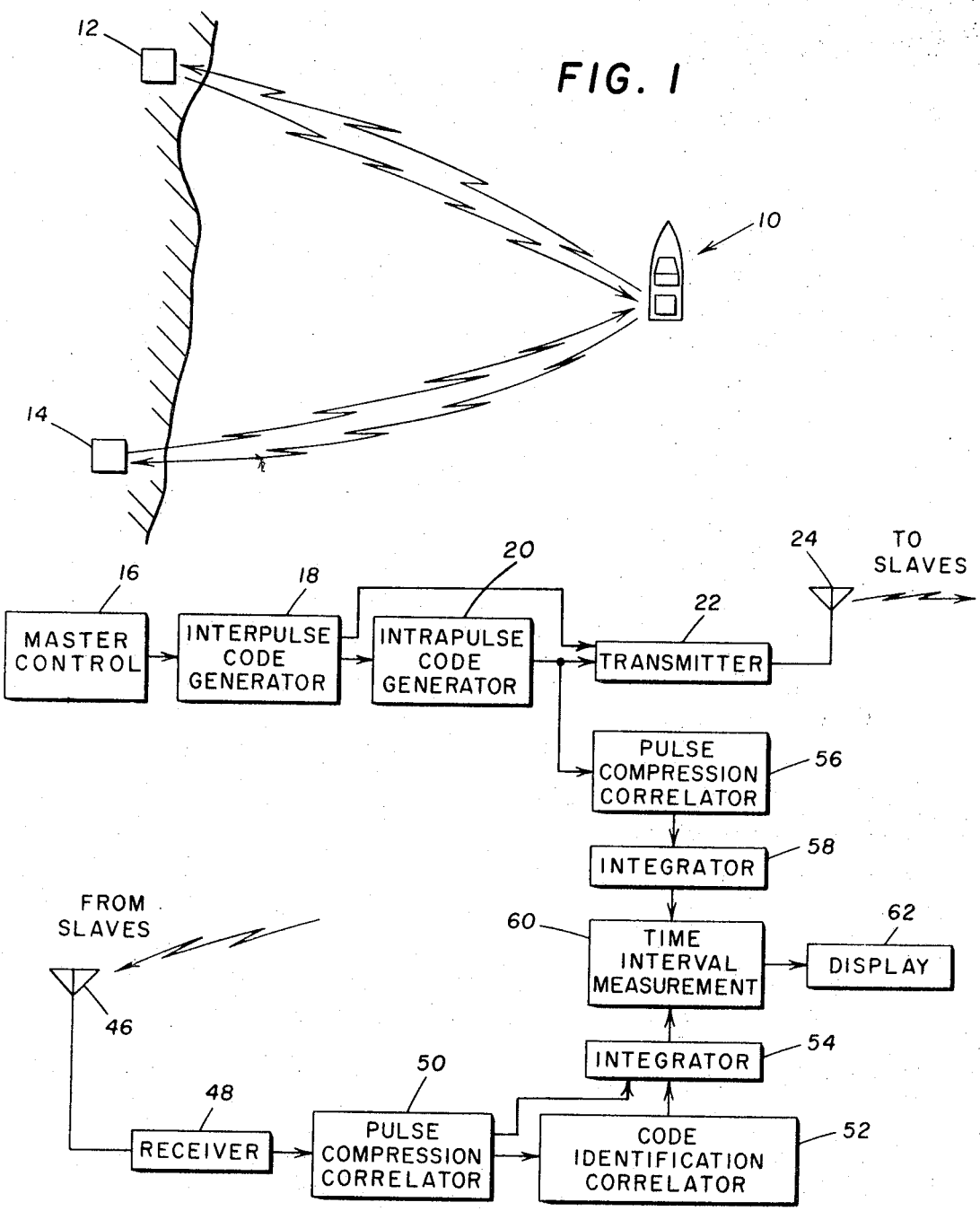

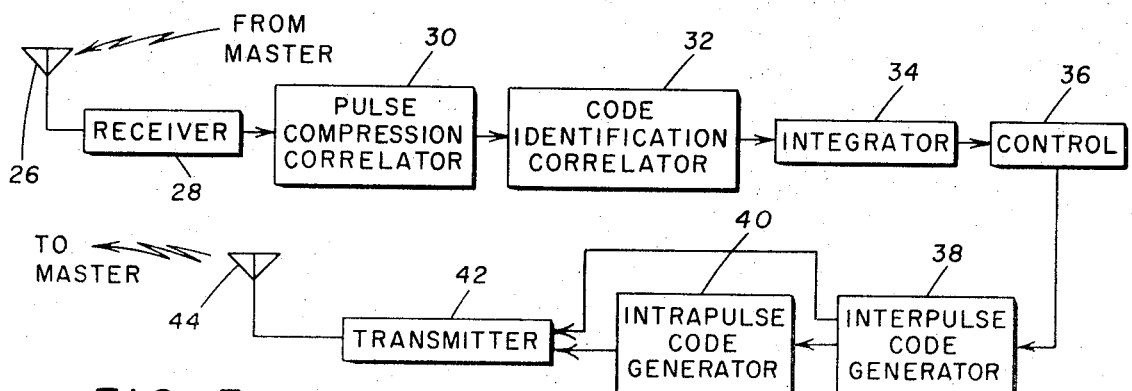
FIG. 3
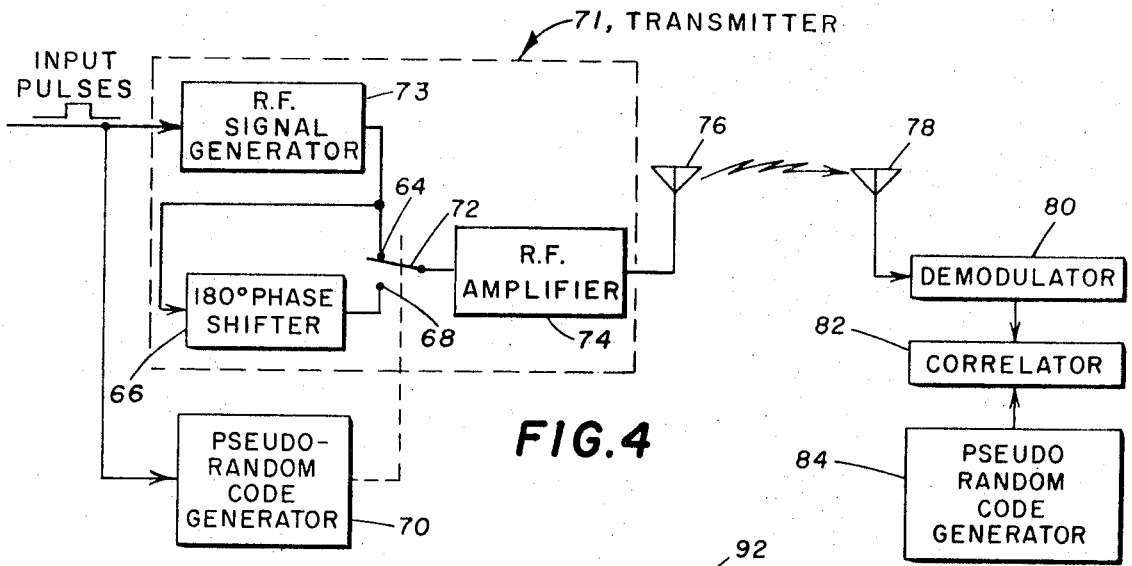
FIG. 4
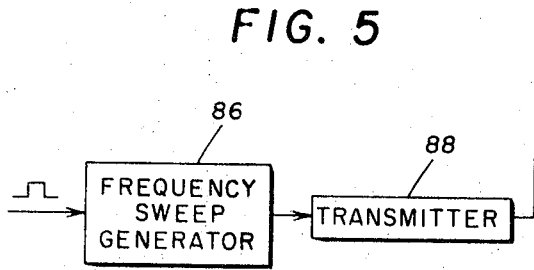
FIG. 5
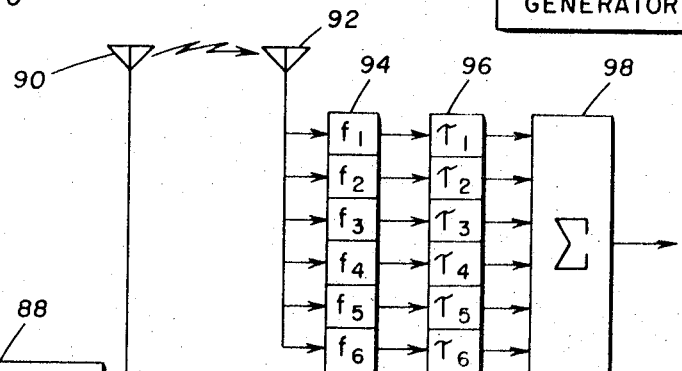
INVENTOR
HARRY A. CURRIE et al

RADIO POSITION DETERMINING SYSTEM

This invention relates to a position determining method and system, and more particularly to a pulse modulated position determining method and system for use with seismic exploration vessels.

A substantial amount of seismic exploration is presently carried out in ocean areas several hundred miles from shore. Although exploration in such areas imposes navigation problems, it is imperative to provide extremely accurate position information for the seismic exploration vessels at all times, in order that the seismic data obtained by the vessels can be accurately correlated with the actual location of the ocean bottom being surveyed. Further, it is often desirable to maintain the positions of seismic exploration vessels secure from the attention of foreign vessels.

Numerous systems have been heretofore developed for providing positional information for vessels at sea. For instance, U.S. Pat. Nos. 3,181,146 and 3,181,155 issued Apr. 27, 1965, disclose radar systems located aboard a vessel to transmit pulsed signals to fixed position shore targets and to receive reflected pulses from the targets for determination of the round trip traveltime of the pulses. The position of the vessel with respect to the targets is then determined.

U.S. Pat. No. 3,206,752, issued Sept. 14, 1965, discloses another type of position determining system wherein the relative phases of signals radiated from fixed position stations provide indications of the position of a ship. Such systems may either utilize a number of concentric circle equal phase lines, or a number of hyperbolic equal phase lines to provide positional information.

Although previously developed systems of various types have provided useful position information for seismic exploration vessels in certain instances, such prior systems have often not provided completely satisfactory operation during all periods of the day or during all periods of the year, due to atmospheric condition variations and storms. Further, prior systems have often required relatively expensive, complex and large high powered shore based installations. Since offshore seismic exploration is generally conducted in an area for a relatively short time and then the seismic exploration vessel is moved to another ocean area, the transportation of such large shore based stations was prohibitive. On the other hand, in prior systems which utilized relatively compact shore based stations, problems often arose due to limitations on range of the systems or the resolution of the systems. Further, previous developed systems have not been completely satisfactory with respect to security of information transmission.

In accordance with the present invention, a master station located aboard a seismic exploration vessel transmits modulated signals adapted to the use of pulse compression techniques in a receiver, to a pair of spaced apart shore stations, which in response to the received groundwaves of the signals, transmit modulated signals, also adapted to the use of pulse compression techniques, to the master station. Circuitry at the master station computes the time interval for the round trip travel of the signals to provide indications of the distance of the vessel from each of the shore stations. The utilization of pulse compression modulation techniques provides dependable operation of the system during diverse atmospheric conditions to provide excellent resolution with minimum power requirements.

For a more complete understanding of the present invention and for further objects and advantages thereof, reference may now be had to the following description taken in conjunction with the accompanying drawings, in which:

FIG. 1 is a diagrammatic illustration of the use of the present invention to determine the position of a seismic exploration vessel;

FIG. 2 is a block diagram illustrating an embodiment of the master circuitry contained onboard the seismic exploration vessel shown in FIG. 1;

FIG. 3 is a block diagram illustrating an embodiment of the slave circuitry contained at the shore based stations shown in FIG. 1;

FIG. 4 is a block diagram illustrating one embodiment of the intrapulse code generator shown in FIGS. 2 and 3; and FIG. 5 is a block diagram of another embodiment of the intrapulse code generator shown in FIGS. 2 and 3.

FIG. 1 illustrates the present system for determining the position of a seismic exploration vessel designated generally by the numeral 10. Two fixed position stations 12 and 14 are spaced apart at known locations on the shoreline and receive coded pulses transmitted from the vessel 10. Shore stations 12 and 14 each then respond and transmit coded pulse signals back to the vessel 10. The round trip traveltime for the signals is computed aboard vessel 10 to provide indications of the range of the vessel 10 from each of the shore stations 12 and 14. Since the positions of the shore stations 12 and 14 are known, the position of the vessel 10 may be determined with accuracy. This general type of system is termed a range/range system and effectively determines the intersection of two range circles drawn about the shore stations 12 and 14 to determine the position of the vessel 10.

If several exploration vessels are in the area, each of the vessels transmits a different pulse code to the shore stations on a time sharing arrangement. The shore stations respond separately to each different code in order to provide position indications for each of the vessels.

As previously mentioned, it is desirable that the shore stations 12 and 14 be sufficiently compact and lightweight to be easily portable for removal after an area has been surveyed. However, the present system must have sufficient power to provide accurate resolution at ranges up to 300 miles. The present invention fully meets these requirements for an accurate, yet practical radio positioning system by the use of pulse compression techniques at frequencies requiring relatively small antenna systems and moderate transmission power.

Briefly, a preferred embodiment of the invention utilizes antennas at the shore stations having lengths 50 feet or less. The system receives only the groundwave portions of pulse signals having carrier frequencies between 2 MHz and 5 MHz with a bandwidth of 200 kHz. to provide positional accuracy of in the range of 10 feet from distances up to about 300 nautical miles. This accuracy is obtained with a transmitter power of 1000 watts or less with the utilization of pulse compression techniques.

FIG. 2 illustrates a block diagram of an embodiment of the circuitry located onboard the vessel 10. A master control 16 enables the system by turning on an interpulse code generator 18 which conventionally provides a high correlation pseudorandom code or other distinctive signal to enable identification of the signal by the remote shore stations. This identification signal controls the transmitter 22 and an intrapulse code generator 20 which generates a unique modulation signal which enables the receiver to use pulse compression techniques to improve the resolution of the system without the imposition of high power requirements. By the term "interpulse code" is meant the code of transmission frequency pulsing to provide information. By the term "intrapulse code" is meant the code pattern or modulation imposed on the carrier within each pulse or within an individual pulse of the interpulse code. The intrapulse code is of a type adaptable to the use of pulse compression techniques at the receiver. As will be later described, intrapulse code generator 20 may comprise a modulator for sweeping each transmitted pulse over a limited frequency range, or alternatively may comprise a modulator for modulating the phase of individual portions of the pulses. The output from the generator 20 is fed to a transmitter 22 for transmission from an antenna 24 to the slave shore stations 12 and 14.

In order to enable use of the system 24 hours per day with extreme accuracy, only groundwave portions of the transmitted pulse signals from the antenna 24 are received by the shore stations 12 and 14. Antennas 26, shown in FIG. 3, at each of the shore stations 12 and 14 receive the pulse signals. A receiver 28 having the required sensitivity passes the received groundwave signals to a pulse compression correlator 30. Conventional gate circuitry is provided within the receiver 28 to gate the receiver off after reception of the groundwave portion of the transmitted pulse signals. This prevents the reception of the later arriving skywave portions of the transmitted pulses, which are unreliable due to variances in atmospheric layers and the like. Correlator 30 demodulates the pulse signals and provides an indication of the correlation between the received pulses and stored representations of the preselected intrapulse code to provide an indication of the true arrival of the received pulses. The output from correlator 30 is passed to a code identification correlator 32 which identifies the interpulse code to determine which vessel is transmitting, in the case of a number of vessels using different codes, and to prevent the acceptance of unwanted signals or noise. Correlators 30 and 32 may comprise any one of a number of known correlation circuits wherein the input signal is compared with a stored replica of the transmitted signal. The time of arrival of the signal may be determined by the time of maximum correlation between the signal and the stored replica.

The output from the correlators 30 and 32 is fed into an integrator 34 which averages the arrival times of the signals over a period of time in order to average out noise to provide a more accurate indication of the true arrival time. When a correctly coded signal is received by the antenna 26 and passed through the correlation circuitry, an output from integrator 34 initiates a pulsed response signal from a control circuit 36. In one of the shore stations 12 and 14, a delay is provided in the control circuitry 36 to prevent the simultaneous transmission of interrogated signals from both shore stations to the vessel 10.

Control circuit 36 provides control signals to an interpulse code generator 38 which provides a distinctive identification signal that may or may not be the same code which was transmitted from the vessel 10. The identification signal controls the transmitter 42 and an intrapulse code generator 40, wherein the signal is subjected to pulse compression techniques according to a preselected coding. The modulated signal is then transmitted by a transmitter 42 via an antenna 44 back to the vessel 10.

Referring again to FIG. 2, the signals transmitted by the shore stations 12 and 14 are sequentially picked up by an antenna 46 and receiver 48 located on board the vessel 10. Again, receiver 48 includes circuitry, such as a threshold detector and gate, which cuts off the receiver before reception of any portion of the skywave of the transmitted pulses. Therefore, only the groundwave portion of the transmitted pulses are passed from the receiver 48 to a pulse compression correlator 50. Correlator 50 determines the correlation of the intrapulse coding of the received pulse signals with a preselected intrapulse code to determine the true arrival of the received signal with accurate resolution. The signals are passed through a code identification correlator 52 which operates upon the interpulse modulation code of the signal to identify the signal as being transmitted from a particular remote station.

The correlated signals are passed to an integrator 54 for integration of arrival times over a time interval to get the average time of arrival, thereby improving the resolution of the system by averaging out errors made in the measurement of signal arrival time. A pulse compression correlator 56 operates on the transmitted signal according to the preselected intrapulse code to provide an output to an integrator 58. The arrival times of the correlated outputs are averaged by integrator 58 to provide an indication of the true time of transmission of the original pulsed signal by the transmitter 22. The outputs from the integrators 54 and 58 are compared by conventional time interval measurement circuitry 60, which provides an output signal representative of the true roundtrip time of travel of the pulsed signals measured from the instant of transmission from the antenna 24 to the reception of the signal on antenna 46.

Circuitry is provided in the time interval measurement circuitry 60 to compensate for any time delay introduced by the shore stations as previously mentioned. The time interval output signal is displayed by a suitable display 62 to provide an indication of the range of the vessel 10 from each of the shore stations 12 and 14. Display circuitry 62 may include a small onboard computer which operates upon the range/range measurements to provide a direct indication of the coordinates of the position of the vessel 10.

The advantages of the use of pulse compression techniques are numerous. The resolution of the system is greatly improved without large power requirements. The system is not greatly affected by severe noise conditions, as the pulse compression pulses can be detected in a large amount of noise. Further, the system provides very secure position determining transmission, due to the fact that the pulsed signals are generally masked in noise to an intruder who does not have the benefit of the codes being utilized.

FIGS. 4 and 5 illustrate examples of different types of intrapulse modulation, or pulse compression modulation systems for use in the invention. FIG. 4 illustrates an example of a pulse compression system for use in the present invention utilizing the phase-coded technique. Pulsed signals from an interpulse code generator are fed to an RF signal generator 73 in the transmitter 71 which produces RF pulses in response to the pulsed input signals. These pulsed RF signals are fed to a first switch terminal 64 and additionally through a 180° phase shifter 66 to a second switch terminal 68. A pseudorandom code generator 70 controls a switch arm 72 according to a preselected pseudorandom binary code. The code generator 70 operates the arm 72 on a long pulse of duration $\tau$ for $B\tau$ subintervals, each of the subintervals having a duration of $1/B$, where B is the desired bandwidth of the compressed pulse. The pulse compression ratio is basically equal to $B\tau$. The phase for each of the subintervals is thus either left unchanged or else reversed in phase by 180°, dependent upon the position of the switch arm 72 which in turn is dependent upon whether the particular binary sequence of the pseudorandom code is zero or one.

The phase-coded pulse is then fed to a RF amplifier phase-coded and transmitted via an antenna 76 to a receiving antenna 78. The signal is demodulated by a demodulator 80 and is fed into a correlator 82, wherein it is compared against the output of a pseudorandom code generator 84. Code generator 84 presents the same code as provided by generator 70, and thus the correlator 82 provides an output indicative of the time of arrival of the transmitted pulse which has a much higher resolution than would a system which attempted to detect the leading edge of an unmodulated transmitted pulse.

Other types of systems may also be utilized to provide phase-coded pulse compression, such as a tapped delay line containing $B\tau$ equally spaced taps. Phase varying circuitry is provided at each of the taps to maintain the phase of the output signal unchanged when the code calls for zero, but to reverse the phase by 180° when the code calls for one. The phase-coded signal is then transmitted. On reception of the phase-coded signal, the signal is passed through a similar delay line with the taps arranged in reverse order. Phase changes other than 180° may also be used without adversely affecting the accuracy of the system.

FIG. 5 illustrates a block diagram of a basic system for pulse compression utilizing frequency modulation. An example of such pulse compression modulation in radar is termed CHIRP. In the system of FIG. 5, a frequency sweep generator 86 modulates an incoming pulse with a frequency sweep across a preselected frequency band. The frequency modulated pulse is transmitted by transmitter 88 over an antenna 90, and is received by receiver antenna 92 and fed into a plurality of matched filters 94. Each of the matched filters 94 are fed into corresponding weighted time delays 96, the time delay intervals being slightly varied for each circuit 96. The output of the time delay circuits 96 are summed by a summing circuit 98 to provide an output signal with an increased effective power and a reduced pulse width. For a more detailed description of various types of pulse compression systems, reference is made to "Introduction to Radar Systems" by Merrill I. Skolnik, McGraw-Hill, pages 493—500.

The use of only the groundwave portions of the transmitted signals reduces errors caused by different reflection paths of the skywaves during different atmospheric conditions, but such use also imposes limitations upon the pulse width of the transmitted signals. For example, the worst case condition for operation of the system which would allow a minimum time for reception of the groundwaves is during daylight with the D atmospheric layer at its minimum altitude of 40 miles. Assuming that the vessel 10 is 200 statute miles from each of the ground stations 12 and 14, the groundwave transit time of the transmitted pulses would be approximately 1070 microseconds, with the skywave transit time of the transmitted pulses being approximately 1170 microseconds. Thus, about 100 microseconds is available for detection of the groundwave before the skywave arrives. For this case, a transmitted pulse of about 100 microseconds would be the maximum usable pulse length.

Additionally, the use of only groundwave portions of the transmitted signal imposes limitations upon the interval between the transmitted pulses. Assume that the maximum transit time of the transmitted signals at the longest range to be used by the system occurs at night with the F2 atmospheric layer at its maximum height of 250 miles. If the vessel 10 is 600 miles from each of the shore stations 12 and 14, the groundwave transit time for the transmitted signal would be about 3300 microseconds and the skywave transit time about 4200 microseconds. Thus, about 1000 microseconds must be allowed after initial reception of the groundwave portion of the transmitted pulse before the skywave disappears and another groundwave portion of the pulse can be received without interference. With a maximum transit time of 100 microseconds and a minimum off time of the system of about 1000 microseconds, the maximum duty cycle of the transmitted signal is one-tenth. For an average radiated power of 100 watts, the peak transmitted power for the transmitter 22 would be about 1000 watts. Different duty cycles will result in different ratios of average power to peak power.

The minimum acceptable input signal-to-noise ration of the signal is dependent upon the acceptable error rate of the system. Errors in the system may occur if a receiver of the system fails to recognize a transmitted pulse, or if a receiver mistakes a noise pulse for the received pulse. Assuming that a practical code for use with the invention is made up of the presence of a received pulse of a 1, and the absence of a received pulse, or a 0, we may conveniently assume that an equal number of 1's and 0's are present in a given binary word. Therefore, with a PRF of 1000, 500 pulses would be received in one second. Allowing 2 seconds for the system to obtain a complete navigational fix on a remote station, 1000 return pulses are provided to the system for processing and computing. Other type pulses other than "on" and "off" may be used whereby 1's and 0's are represented by different modulation codes during the pulses. This will result in a greater average transmitted power.

Dependent upon the required probability of detection and the required probability of a false alarm for the system, a minimum allowable signal-to-noise ratio for the receiving portions of the system will be fixed. For instance, in the specific instance described above, a probability of detection of 99.9 out of 100 and a probability of false alarm of 1 pulse out of 1000 would require a signal-to-noise ratio for the receiving system of about 14 db. Assuming that the pulse compression portion of the receiving circuitry contributes 13 db. of effective power gain, the required input signal-to-noise ratio of the receivers would then be ±1 db.

In order to meet the operational requirements of the system, it is necessary that the signal strength at both the transmitting antennas and at the receiving antennas be of sufficient magnitude to provide the required signal-to-noise ratio, which is in the specific embodiment being described is about +1 db. Various parameters must be considered in order to determine if the peak transmitted power of 1000 watts for the specific embodiment being described is adequate to provide suitable signal strength at all times in various environments. For instance, the signal level of the groundwave of the pulse signals at a distance from the transmitter is a function of such factors as transmitter power, antenna power, height of the antenna, efficiency of the antenna, frequency of transmission, distance from the transmitter, refraction of the atmosphere, and conductivity and dielectric constant of the medium over which the wave is transmitted.

Utilizing calculations according to "Calculation of Groundwave Field Intensity Over a Finitely Conducting Spherical Earth" by K. A. Norton, Proceedings of the IRE, Dec., 1941, for a transmitted signal of strength of 100 millivolts per meter at 1 statute mile over a perfectly conducting earth as produced by a 1 kilowatt transmitter with a short vertical antenna at sea level, it is found that at 2 MHz a groundwave signal strength of 50.5 microvolts per meter occurs at approximately 320 statute miles from the transmitter. Such calculations also show that the groundwave field intensity changes according to the transmitted frequency. For instance, the field intensity value at 2MHz is 35 db. greater than the value at 10 MHz at a distance of 400 statute miles, the values being 23 microvolts per meter and 0.4 microvolts per meter, respectively. These calculations tend to limit the optimum transmission frequency below 10 MHz.

Variations in ground characteristics such as conductivity and dielectric constant sometimes have adverse effects on the system operation. Thus, the presence of islands, marshes, and varying sea water salinity tend to degrade the result obtained by the present positioning system. In fact, transmission from sea to land results in an abrupt and continuing decrease in signal strength at the cost line. The shore stations 12 and 14 should thus be located as close to the shore line as possible, and in the preferred embodiment of the invention the stations 12 and 14 are placed on pilings in shallow water, with an RF ground system extending into the sea water.

In order to finally determine the range and reliability of the preferred embodiment of the invention, the noise with which the transmitted signal must compete must be considered. Noise generated within the receiver itself and that due to antenna and transmission line losses are found to be generally negligible in the present system. However, external noise, and particularly atmospheric noise, must be taken into account. Calculations utilizing data of various noise characteristics for areas throughout the world for different periods of the year found in "World Distribution and Characteristics of Atmospheric Radio Noise, C.C.I.R.," Report 322, I.T.U. Geneva, 1964, result in the determination that a noise level of 70 db. above $KT_ob$ at 2 MHz is an approximation of the worst median noise conditions to which the system would be subjected.

In order for the system to provide a 90 percent operational reliability in the face of such median noise conditions, assuming the previously determined system parameters including a bandwidth of 200 kHz. and operation on the groundwave vertical electrostatic component of the transmitted wave, a signal strength of about 50 microvolts per meter is required for adequate operation of the system in the face of such noise. As previously noted, this signal strength is provided by the present system up to a range of over 300 statute miles. Thus, the present system is capable of providing 90 percent signal propagation reliability at ranges up to 300 statute miles throughout the year and under the worst theoretical tropical noise conditions at sea.

From considerations of the signal-to-noise ratio provided by the present system with various frequencies, it is found that optimum performance for the invention will be realized with a carrier frequency in the band of 2 to 5 MHz, with a bandwidth of 200 kHz. The upper frequency limit for suitable operation appears to be about 10 MHz, with such lower propagation reliability. However, operation of the system in different frequency ranges may be desirable for some applications.

The present invention thus provides a system which provides optimum performance within a selected range over a large percentage of the time under varying weather conditions. Resolution to within about 10 feet may be obtained at ranges up to about 300 miles. While specific embodiments of the invention have been disclosed, it will be understood that various changes and modifications will be suggested to one skilled in the art, and it is desired to encompass such changes and modifications by the appended claims.

Thus, there has been illustrated the use of interpulse and intrapulse modulation techniques in range/range-types of positioning systems. These same techniques are equally applicable to hyperbolic navigation systems wherein the ship portion of the system is completely passive and three or more shore stations are used. These pulse compression techniques may be used to greatly enhance the accuracy of such systems by making possible more accurate signal time-of-arrival measurements in the presence of low signal-to-noise conditions.

We claim:

1. A radio positioning system for a seismic exploration vessel comprising:
   a. transmitter means on said vessel for transmitting high frequency pulse signals having interpulse modulation providing a pseudorandom pulse code modulation and intrapulse modulation enabling the use of pulse compression techniques;
   b. a pair of spaced apart stations each having means for receiving said high frequency pulse signals and means for transmitting interpulse and intrapulse modulated signals in response to said high frequency pulse signals;
   c. receiving means on said vessel for receiving said signals which includes means for decoding the received pseudorandom code modulation and for utilizing pulse compression techniques to determine the true arrival of the received signal; and
   d. means for determining the time intervals between transmission of said high frequency pulse signals and receptions of said interpulse and intrapulse modulated signals from said spaced apart stations to indicate the distance of said vessel from each said stations.

2. The system of claim 1, wherein said signals are transmitted at a carrier frequency of between 2 and 5 MHz with a bandwidth in the range of 200 kHz.

3. The system of claim 1, wherein said stations are portable and have antennas of lengths in the range of 50 feet.

4. The system of claim 1, wherein the transmitting power of said transmitter means is in the range of 1000 watts.